United States Patent [19]

Milholen

[11] Patent Number: 4,669,968
[45] Date of Patent: Jun. 2, 1987

[54] METHOD AND APPARATUS FOR BRICK SETTING

[75] Inventor: William F. Milholen, Siler City, N.C.

[73] Assignee: Pearne and Lacy Machine Co., Inc., Siler City, N.C.

[21] Appl. No.: 676,431

[22] Filed: Nov. 29, 1984

Related U.S. Application Data

[63] Continuation-in-part of Ser. No. 480,719, Mar. 31, 1983, abandoned.

[51] Int. Cl.[4] .................. A01J 21/00; B65G 47/26
[52] U.S. Cl. .................................... 425/385; 198/422; 198/458; 414/38; 414/56; 414/759
[58] Field of Search ............... 198/374, 414, 419, 420, 198/422, 456, 458; 414/34, 38, 55, 56, 759, 771, 774; 425/315, 385, 403.1

[56] References Cited

U.S. PATENT DOCUMENTS

| | | | |
|---|---|---|---|
| 1,876,211 | 9/1932 | Dyhrberg | 198/429 |
| 3,478,397 | 11/1969 | Pearne et al. | 25/2 |
| 3,589,495 | 6/1971 | Pearne et al. | 198/33 |
| 3,716,264 | 2/1973 | Pearne et al. | 294/63 |
| 3,919,372 | 11/1975 | Vogele | 414/38 |
| 4,147,491 | 4/1979 | Postell, Jr. | 425/385 |
| 4,173,910 | 11/1979 | Lineberry et al. | 83/29 |
| 4,342,531 | 8/1982 | Cox et al. | 414/46 |

FOREIGN PATENT DOCUMENTS 2234936 1/1974 Fed. Rep. of Germany ........ 414/38
2353215 5/1974 Fed. Rep. of Germany ...... 414/774

*Primary Examiner*—Joseph E. Valenza
*Attorney, Agent, or Firm*—Pearne, Gordon, Sessions, McCoy, Granger & Tilberry

[57] ABSTRACT

A brick setting machine is disclosed which is operable to face set, stack without inverting or flat set. The machine is also operable to laterally space each brick from the next adjacent brick so that the faces and edges of the brick can be separately textured. The stacking, face setting and flat setting of the brick are performed by a plurality of elongated trays or turners which are operable to simultaneously rotate substantial numbers of brick through 90° so that they rest on their sides and then when stacking or face setting is required to rotate adjacent rows of brick through an additional 90° to form pairs of vertically aligned brick one resting on the other. The stacking is provided without gripping the brick so as to avoid damage to the brick.

9 Claims, 44 Drawing Figures

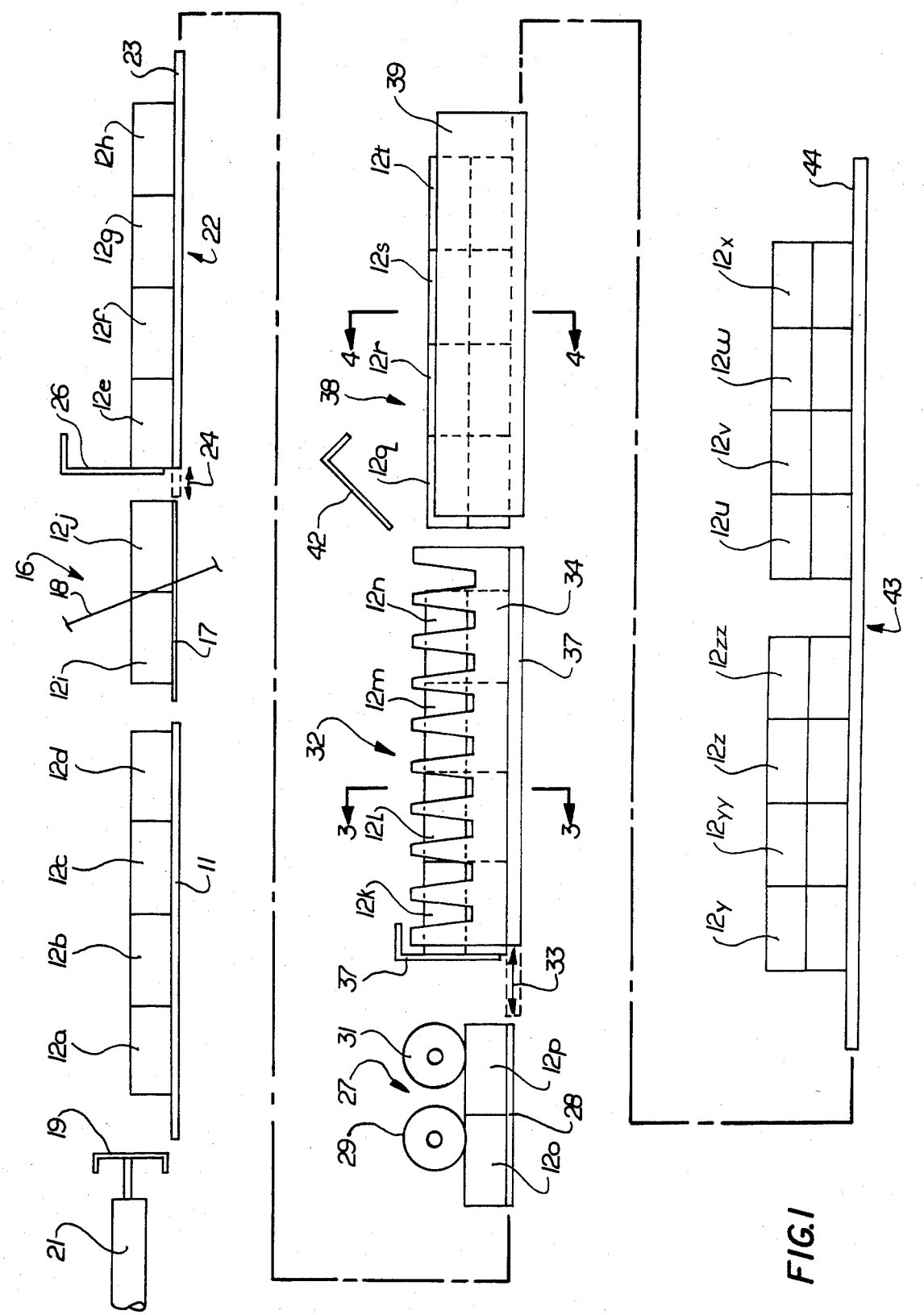

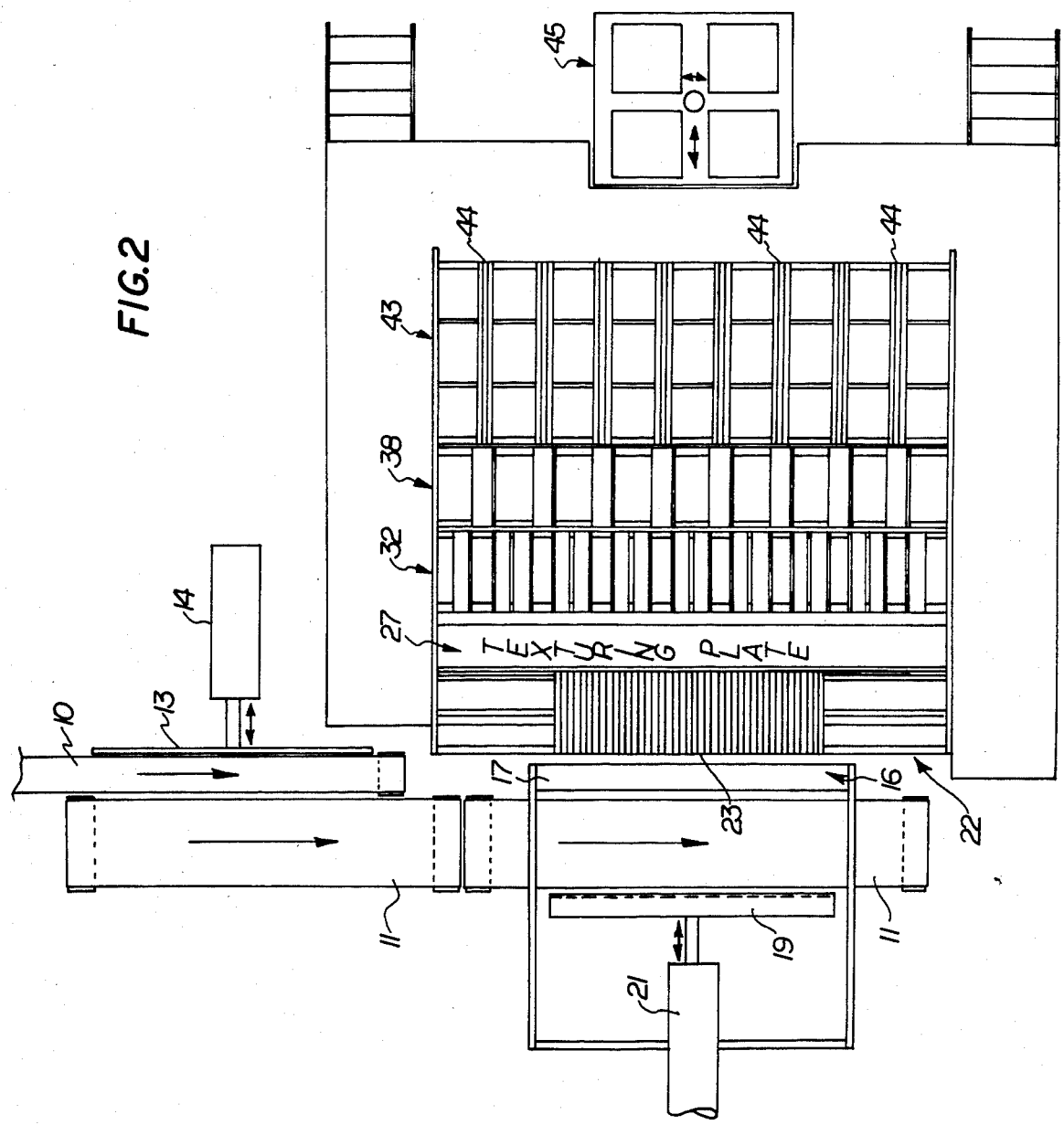

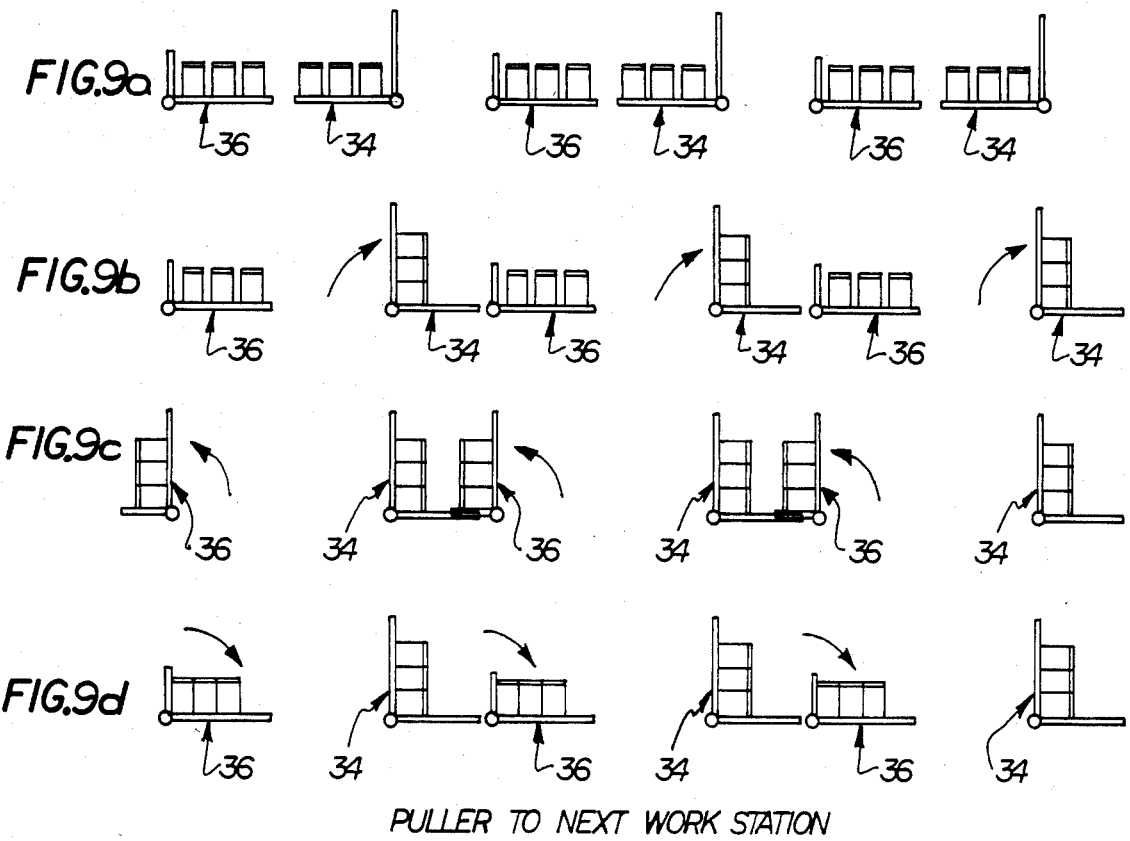
PULLER TO NEXT WORK STATION
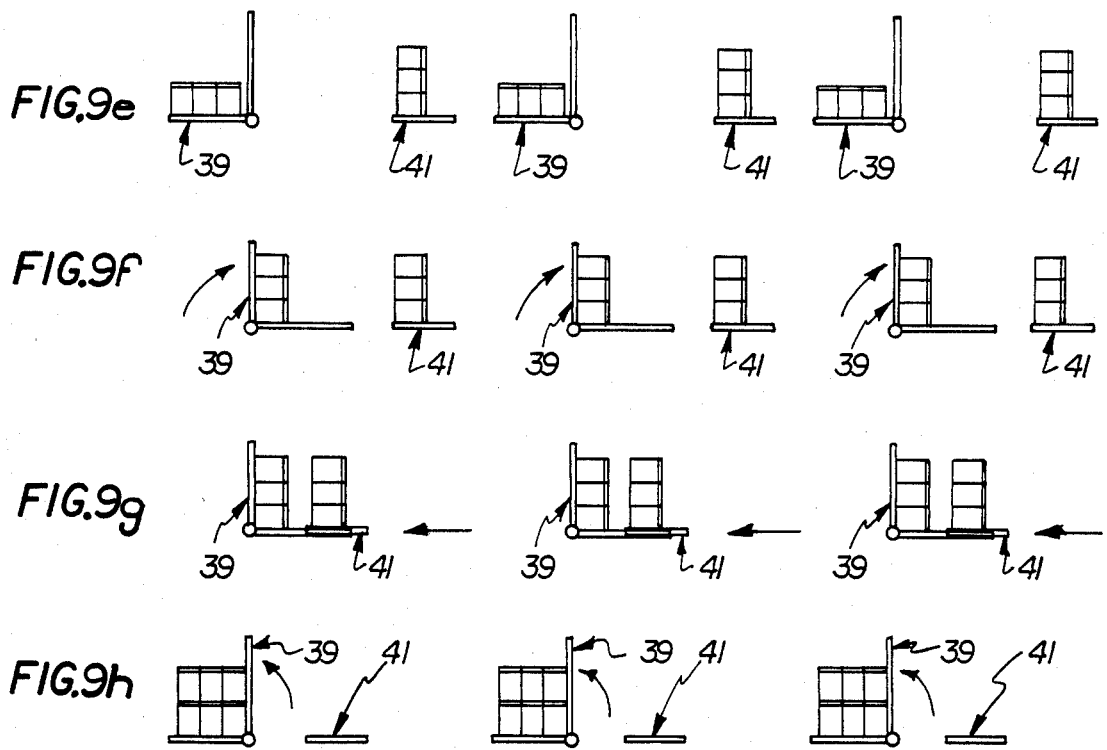

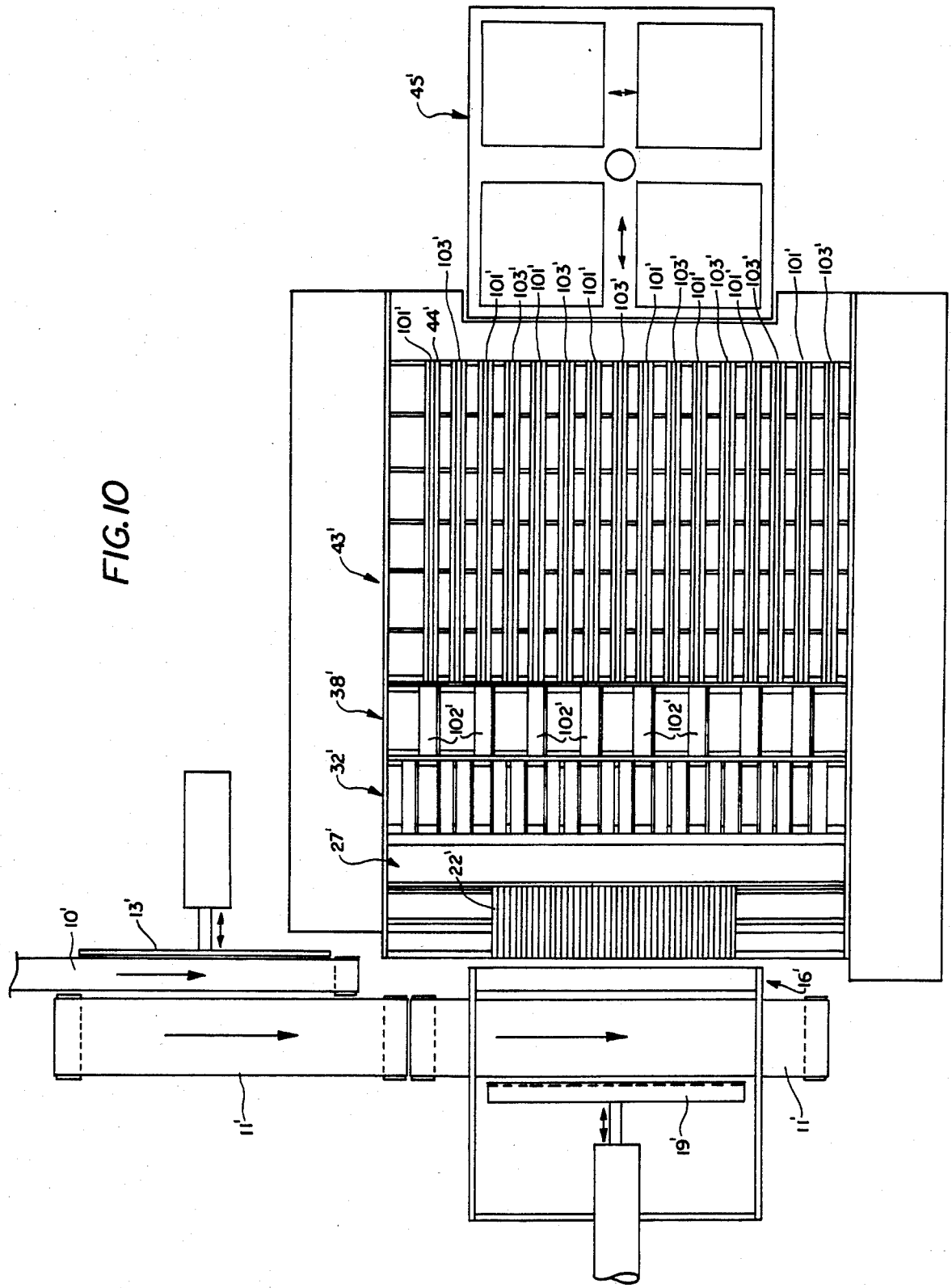

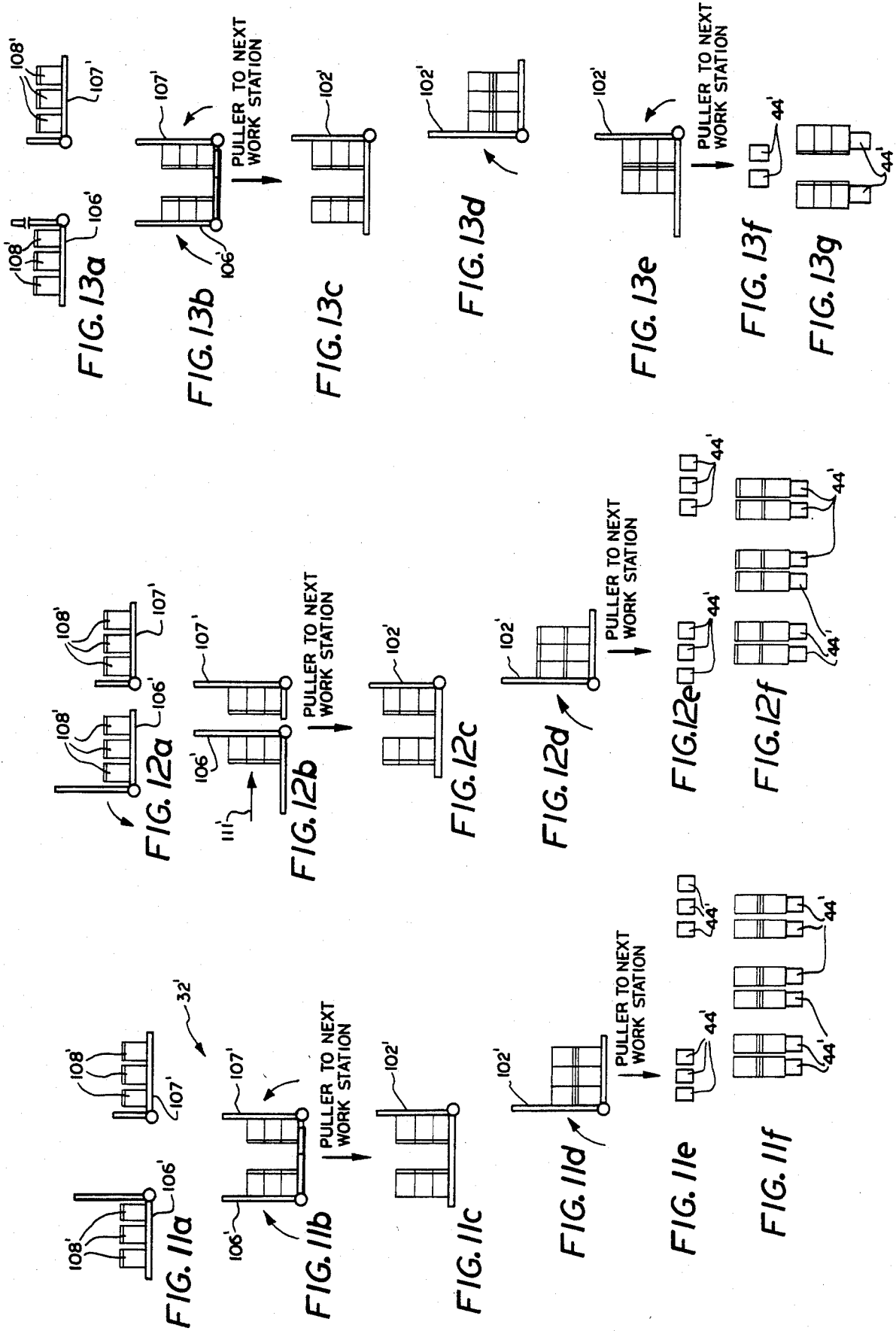

METHOD AND APPARATUS FOR BRICK SETTING

This is a continuation-in-part of Ser. No. 480,719 filed Mar. 31, 1983, now abandoned.

BACKGROUND OF INVENTION

This invention relates generally to a novel and improved brick setting method and apparatus for forming and setting unfired brick on a kiln car for firing.

PRIOR ART

Generally unfired brick are arranged on a kiln car in arrays of rows of brick consisting of stacks of brick one resting on another. Such arrays are usually positioned on the kiln car with one array having rows extending in one direction along the car and the next array above positioned on the previous array with a row extending in a perpendicular direction. With such types of stacks the brick tie together and it is possible to stack a relatively large number of arrays on a car to form relatively high stacks.

Generally there are three known systems for stacking. One commonly used system involves the formation of arrays consisting of rows of pairs of brick with the lower brick in a pair position with its face upward and an upper brick positioned on the lower brick with its face also positioned on the upper side thereof. Such setting system is usually referred to as stacking or stacking without facing.

Another commonly used system involves inverting the upper brick on the lower brick in an array so that the face of the lower brick engages and supports the face of the upper brick. Such system is generally referred to as face setting and involves equipment generally referred to as an inverter stacker.

A third system for forming arrays is known as flat setting. In such system the arrays provide rows of two or more brick resting on each other in which the brick in each row are lying on their side so that the brick faces are exposed.

The type of setting whether it be stacking, face setting or flat setting which is selected by the manufacturer of brick is determined by the type of brick being formed, the particular texturing or coloring desired by the manufacturer and the type of firing used to fire the brick. For example, face setting is often desired when the kiln used to fire the brick is fired with solid fuel such as wood chips, since the two faces of the brick in each pair rest against each other and therefore protect each other from unwanted discoloration Stacking without facing is desired in many instances because it can be used to produce brick having desired types of color variation in their faces. Flat setting is selected in some instances particularly where it is desired to produce brick having a very uniform face color. In the flat setting system the entire face of the brick is exposed in a uniform manner to the firing gasses.

The U.S. Pat. No. 3,589,495 to Pearne et al. discloses an automatic setting machine which can be operated to produce either face set brick or stacked brick. Such machine includes an apparatus which can stack one slug upon another slug with inverting or without inverting. This stacking or inverting operation can be performed on the slug prior to cutting or after cutting as desired. When the stacking or inverting operation is performed before the brick are cut, the brick are cut two high. When the brick are cut two high, the cut edges of the brick cannot be textured conveniently so it is common to cut the slugs prior to the stacking or inverting operation so that the cut edges can be rolled or otherwise treated. In such systems the edge treatment occurs while the brick of the slug are in abutting engagement. Because of such abutting engagement only a limited amount of edge treatment can be performed on the brick. The U.S. Pat. No. 4,147,491 illustrates a system for performing a greater amount of edge treatment to the brick in which alternate brick in a given slug are raised clear of the adjacent intermediate brick so that substantial edge treatment can be performed on the exposed edges.

Most prior art inverters and stackers have included grippers which grip the brick during the stacking operation. Such gripping often caused brick damage and resulted in scrap, particularly when two laterally abutting cut slugs were simultaneously gripped. Also such gripping can cause small fractures which are not noticeable but which cause brick deterioration when water enters and then freezes. It is however also known to invert without gripping. The U.S. Pat. No. 4,342,531 describes inverting without gripping but the system of such patent involves turning the brick on their ends. Also the U.S. Pat. No. 4,173,910 discloses a system for stacking without gripping. However, neither of these systems can selectively face set or stack without facing.

In machines for flat setting brick, it is also known to provide a pre-spreading mechanism which laterally spreads the cut slug to provide spaces between at least some adjacent brick therein. In such machines the spread brick are then pulled onto a turner system which turns the brick onto its side usually in groups of two or three brick stacks.

SUMMARY OF THE INVENTION

In accordance with the present invention a method and apparatus are provided which permit the stacking of brick or the like on a platform such as a kiln car in which the arrays within the stack can be either stacked, flat set, or face set. In addition, the individual brick can be provided with face and/or edge texturing treatment to produce brick of substantially any desired kind. For example, a simulated molded brick can be produced by forming a lip along one longitudinal edge of the brick.

Still further, a relatively simple mechanism can be employed to perform the facing, stacking or flat setting operations on a relatively large number of brick during each cycle of operation so that very high production rates can be achieved without rapid cyclic operation of the apparatus. Further, the stacking, facing or flat setting operations are performed without any gripping of the brick. This eliminates the damage to the brick which has been experienced in the past from the gripping operations required by most prior inverters and stackers.

In a first illustrated embodiment uncut slugs are accumulated and delivered to a location adjacent to the wire cutter. A pusher pushes the slugs through the cutter cutting the slugs to form cut slugs or rows of laterally abutting brick. Such slugs are positioned on a pre-spreader which spreads the individual brick to provide a minimum small spacing therebetween.

The spread brick are then moved through a texturing position in which the edges and faces of the brick are textured in any desired way. From the texturing position the bricks are then moved to a first stacking station which is operable to turn the rows of brick for flat setting or face, setting. At this station elongated pivoted L-shaped trays or turners perform the various rotating operations for face settings or flat settings.

After the first stacking station is a second stacking station which cooperates with the first stacking station when stacking without facing is required. From the second stacking station the brick are moved to a spreader table which properly position the brick for transfer to the kiln car or the like by a typical setting head structure such as the type illustrated and claimed in the U.S. Pat. No. 3,716,264. When the apparatus is operated for flat setting or face setting, the flat set brick or face set brick are transfered through the second stacking station without further manipulation and are moved directly to the spreader table. Alternatively, when the stacking without facing is required, the brick are manipulated first at the first stacking station and subsequently at the second stacking station to produce the stacked brick.

In a second illustrated embodiment, slugs are again accumulated and cut to provide rows of laterally abutting brick. Here again the brick are spread and moved through a texturing station to a first stacking station. At the first stacking station elongated turners are provided which turn elongated columns of endwise abutting brick onto their sides. When face setting or flat setting is being performed alternate groups of columns are turned in opposite directions through 90° so that the faces are adjacent. When stacking without facing is being performed the groups of columns are turned through 90° in the same direction so that all of the bricks face in the same direction.

In this second embodiment none of the brick are returned to their edge position at the first stacking position. Instead the columns are moved from the first stacking position to the second stacking position while the brick remain on their sides.

The second stacking position again provides elongated trays or turners which then operate to turn the columns on edge for face stacking and for stacking without facing. For flat setting the turners first turn the columns back onto their edge and then turn the columns back onto their sides.

In all cases the turners at the second stacking station operate to turn the columns at least once. Therefore, the turners operate to accurately position all of the columns. These accurately positioned columns are then moved from the turners at the second stacking station directly onto the main spreader table. Consequently, the columns are accurately positioned on the main spreader table for proper gripping by the gripper head which transfers the brick to the kiln car. Because the various columns are accurately positioned by the turners at the second stacking station immediately before they are moved to the spreader table, a machine in accordance with the second embodiment of this invention can be automatically operated to set a given kiln car with some courses or arrays which are face set while other courses or arrays are stacked without facing and while still other courses or arrays are flat set. Thus, all three modes of setting can be performed on a single kiln car.

The second embodiment also provides another aspect of this invention which is particularly advantageous when the machine is used to set a large kiln car. In accordance with this aspect of the invention, the main spreader table is loaded in steps in which first spaced groups of columns are positioned on the spreader table across the full width of the spreader table and then second groups of spaced columns are positioned on the spreader table between the adjacent first groups. This procedure provides two related but separate advantages. First the length of the slug and the number of turners required can be reduced by one-half. Further the width of the stacking and handling portion of the machine is reduced by about one-half and approximates the width of the spreader table. Therefore it is not necessary to close up the columns as much to reach the position for gripping by the transfer head.

Throughout the operation in accordance with this method and apparatus, it is not necessary to grip the brick in a manner which could cause damage to the brick and result in scrap.

With this invention the stacking operations are simultaneously performed on a relatively large number of slugs. Therefore, high production rates can be achieved even when the stacking apparatus operates at relatively low cyclic speeds.

These and other aspects of this invention are illustrated in the accompanying drawings and are more fully described in the following specification.

BRIEF DESCRIPTION OF THE DRAWINGS

FIG. 1 is a side elevation schematically illustrating a machine in accordance with the present invention

FIG. 2 is a schematic plan view of the overall machine;

FIGS. 9a through 9h illustrate the manipulative steps performed when stacking without facing is performed.

FIG. 10 is a plan view similar in many respects to FIG. 2 but illustrating a second embodiment of a machine in accordance with the present invention;

FIGS. 11a through 11f illustrate the manipulative steps performed by the second embodiment machine when operating to face set the brick;

FIGS. 12a through 12f illustrate the manipulative steps performed by the second embodiment machine operating to stack without facing; and FIGS. 13a through 13g illustrate the manipulative steps performed by the second embodiment machine when operating to perform flat setting operations.

DETAILED DESCRIPTION OF THE DRAWINGS

Figure 1A:
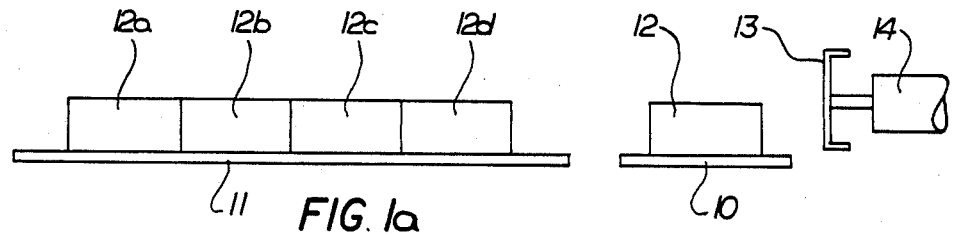
FIG. 1a is a side elevation schematically illustrating a system for marshalling slugs prior to cutting.

FIGS. 1 and 2 along with FIG. 1a illustrate the overall machine in accordance with the present invention. In such machine slugs of extruded brick material are delivered to the machine by the off bearing belt system. In the illustrated embodiment, four slugs are marshalled before cutting and are handled or processed during each operating cycle of the various components of the machine. Therfore, the off bearing belt system is provided with an accumulator or marshalling system illustrated in FIGS. 1a and 2.

At such marshalling location the primary off bearing belt 10 is positioned adjacent to a secondary off bearing belt 11. Single slugs 12 are carried along the primary off bearing belt 10 to a transfer position adjacent to a pusher 13 which is powered by a piston and cylinder actuator 14. The actuator 14 causes the pusher 13 to push the slugs laterally onto the secondary off bearing belt 11 which is wide enough to accommodate four laterally abutting slugs 12 through 12d. The secondary off bearing belt remains stationary until four slugs 12a through 12d are moved from the primary off bearing belt 10 onto the secondary off bearing belt 11.

The secondary off bearing belt 11 then operates to move the four laterally abutting slugs 12a through 12d to a cutting station 16 which provides a transfer plate 17 across which slugs are pushed and cutter wires 18 which operate to cut the slugs into a plurality of laterally abutting brick. Also located at the cutting position is a pusher 19 operated by a piston cylinder actuator 21 which operates to push the four slugs 12a through 12d from the secondary off bearing belt 11 across the transfer plate 17 and through the wires 18.

Although marshalling before cutting is illustrated and is preferred because the cut slugs can move directly onto the spreader table it is within the broader scope of this invention to marshal after cutting.

Adjacent to the transfer plate 17 is a preliminary spreader table 22 having a plurality of spreader bars which in their closed position are aligned with the wires 18 so that one brick from each of the cut slugs rests on an associated spreader bar 23. Such spreader bars are operable to move to an open position in which the adjacent brick in each slug are moved laterally apart for subsequent operations. In the illustrated embodiment the spreader table 22 separates the brick into spaced groups of three brick in which the three brick in each group are spaced a small distance apart (in the order of ½ inch) and the groups are spaced apart a greater distance. Spreader tables of this type are well known in the art and are illustrated for example in the Pearne et al U.S. Pat. No. 3,478,397, cited above.

Typically the spreader bars are opened and closed by piston and cylinder actuators (not illustrated). The spreader table 22 is also arranged so that it can be moved through a short distance toward and away from the transfer plate 17 as indicated by the arrow 24. Such spreader table is located immediately adjacent to the transfer plate 17 while the pusher 19 operates to push the slugs from the secondary off bearing belt across the transfer plate 17, through the wires and onto the spreader table 22. This operation locates four cut slugs 12e through 12h on the spreader table while two slugs 12i and 12j remain on the transfer plate.

After the slugs are properly positioned on the spreader table 22, the spreader table moves axially away from the transfer plate to provide a spacing between the slug 12e and the slug 12j. The spreader table then operates to laterally move the spreader bars 23 apart to space each of the brick in each of the slugs resting thereon laterally apart. Also the spreader table 22 provides laterally spaced groups, each containing three columns of endwise abutting brick.

After the spreader table has opened to spread the brick a puller 26 is lowered down behind the rearward slug 12e and operates to pull the brick longitudinally of the bars 23 through a texturing station 27.

At the texturing station 27, bars 28 are provided which are aligned with the opened spreader bars 23 so that each of the rows of brick are supported and pass under individual texturing rolls arranged in two separate arrays 29 and 31 of axially aligned rollers. These rollers, which are discussed in detail below are shaped to provide the desired texturing of the faces of the brick, the face edges and if desired, the sides of the brick adjacent to the face.

A roller is provided for each row of brick with the rollers in the array 29 being spaced to engage and texture alternate columns of the spread cut slug and the rollers in the array 31 being positioned to texture the intermediate columns.

Because the columns or rows of brick are laterally spaced from each other, it is possible to provide rollers having flanges which extend down into the spaces to engage and texture or shape the sides of the brick back a short distance from the faces thereof. By arranging the texturing rollers in arrays and alternating the position of the rollers it is possible to provide the rollers with flanges extending down between the rows without requiring wide spaces between the adjacent columns.

The puller 26 also operates to pull the slugs past the texturing station 27 on to the first setting or stacking station 32. Here again the first setting station 32 is longitudinally movable as indicated by arrow 33 from a position immediately adjacent to the bars 28 to a position spaced therefrom and substantially adjacent to a second setting or stacking station 38. During the pulling operating performed by the puller 26 to position cut slugs on the first setting station such station is located immediately adjacent to the bars 28. After the slugs are positioned thereon the first setting station is moved to the right to clear the slug from the slugs remaining on the bars 28 of the texturing station as illustrated in FIG. 1. At the completion of the operation of the puller 26, four slugs 12k through 12n are located at the first setting station and two slugs 12o and 12p remain on the bars 28.

Located at the first setting station 32 are a plurality of turners 34 and 36 (the turners 36 are not illustrated in FIG. 1) which are mounted on a frame 37 for pivotal movement through 90°. As described in detail below these turners 34 and 36 are operable to either face set the brick in the slugs 12k through 12n or flat set the brick as desired.

A second puller 37 is operable to drop down behind the brick in the slug 12k after the brick therein have been manipulated by the turners 34 and 36 to move the brick from the turners 34 and 36 to a second setting station 38 where the brick and the slugs can be further manipulated when stacking without facing is required as described in detail below. Located at the second setting station 38 are turners 39 and laterally movable platforms 40 (not illustrated in FIG. 1) which are operable to further manipulate the brick received from the first setting station to complete the stacking without facing of the brick when desired.

The elements of the second setting station 38 need not be longitudinally movable since the movement of the elements of the first turning station to the right as viewed in FIG. 1 places the elements of the two setting stations close enough together to permit the puller 37 to move the slugs from the first setting station to the second setting station 38. When the elements of the first setting station 32 move to the left to receive additional slugs, clearance is provided between the brick to allow manipulation thereof and to allow a third puller 42 to drop down behind the rearwardmost slug located at the second setting station for movement of the slugs from such setting station to the main spreader table of the machine.

At the completion of the operation of the puller 37 to move the slugs from the first setting station to the second station, there are four cut slugs 12*q* through 12*t* located at the second setting station. The operation of the puller 42 moves the slugs from the second setting station on to the main spreader table 43 which is provided with spreader bars 44 which move laterally relative to each other between an opened position and a relatively closed position. In the opened position, a bar 44 is positioned to receive each of the stacks of bricks moved by the puller 42 from the second setting station on to the spreader table 43.

Typically the puller will operate to pull two or more groups of four slugs on to the spreader table 43 as illustrated in FIG. 1. The first group consisting of slugs 12*u* through 12*x* is positioned at the forward end of the spreader table and the second group consisting of the slugs 12*y*, 12*yy*, 12*z* and 12*zz* is spaced from the first group at a position on the spreader table adjacent to the rearward end thereof.

The bars of the spreader table are movable laterally to reposition the rows of stacked brick thereon to the proper position for gripping by a setting head 45 (schematically illustrated in FIG. 2) and for transfer to a kiln car or the like for further processing of the brick. In most instances, the spreader table bars 44 will move the rows closer together since they are substantially spaced when they emerge from the second setting station 38. One typical type of setting head which may be used to transfer the rows of brick to the kiln car or the like is illustrated and claimed in Pearne et al. U.S. Pat. No. 3,716,264. The above cited Pearne et al. U.S. Pat. Nos. 3,478,397; 3,589,495 and 3,716,264 are incorporated herein by reference to illustrate the structure of typical spreader tables, cutter frames, pushers, pullers and setter heads of the general type used in a machine in accordance with this invention.

Figure 3:
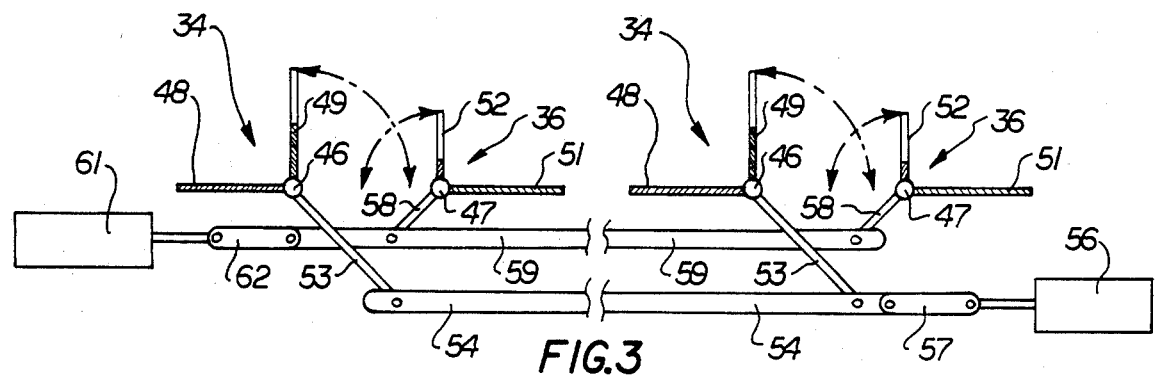
FIG. 3 is a fragmentary section taken along 3—3 of FIG. 1 schematically illustrating the first set of turners and their actuators located at the first stacking station.

FIG. 3 is a fragmentary schematic cross section taken through the first setting station 32 illustrating the turners and actuators provided at such station. There are two sets of turners namely the set of turners 34 and the set of turners 36. Each of the turners 34 is similar in structure to the other turners 34 and each of the turners 36 is similar in structure to the other turners 36. The turners are mounted on a frame (not illustrated) for rotation about spaced and parallel pivots through an angle of 90°. The turners 34 are pivoted at pivots 46 and the turners 36 are pivoted on associated pivots 47.

Each of the turners 34 is provided with two legs 48 and 49 which extend at right angles relative to each other. When the turners 34 are in the position illustrated in FIG. 3, the legs 48 extend horizontally and the legs 49 extend vertically. This is the position in which the turners initially receive the various slugs.

Similarly the turners 36 include two legs 51 and 52 which extend perpendicular to each other. In FIG. 3 the turners 36 are in the slug receiving position in which their legs 51 extend horizontally.

In the slug receiving position the horizontal leg of each of the turners 34 and 36 extend from their respective pivots 46 and 47 in a direction opposite from the horizontal legs of the associated turner.

It should be understood that even though FIG. 3 illustrates two pairs of turners, in a typical machine there will be many pairs of turners and that the turners 34 all operate simultaneously and the turners 36 all operate simultaneously. The turners 34 are each provided with an arm 53 extending from the associated pivot 56 at an angle about 45° to a drive linkage including links 54 interconnecting each of the adjacent arms 53 so that the turners rotate simultaneously through the same angle. A piston and cylinder actuator 56 is connected through a pivot link 57 to the links 54 to provide the power for operating the turners. When the actuator 56 is extended all of the turners 34 rotate in a clockwise direction as viewed in FIG. 3 through 90° to move the legs 48 to the vertical position and to move the legs 49 to a horizontal position as indicated by the arrows.

A similar linkage drive is provided for the turners 36. Here again, the turners are provided with arms 58, connecting links 59, a piston and cylinder actuator 61 and a pivoted link 62. The operation of the actuator 61 to the extending position rotates the turners 36 through 90° to position the legs 51 in the vertical position and the legs 52 in the horizontal position in a synchronized manner. The manner in which the turners are operated to perform the various setting operations is described in detail below.

Figure 4:
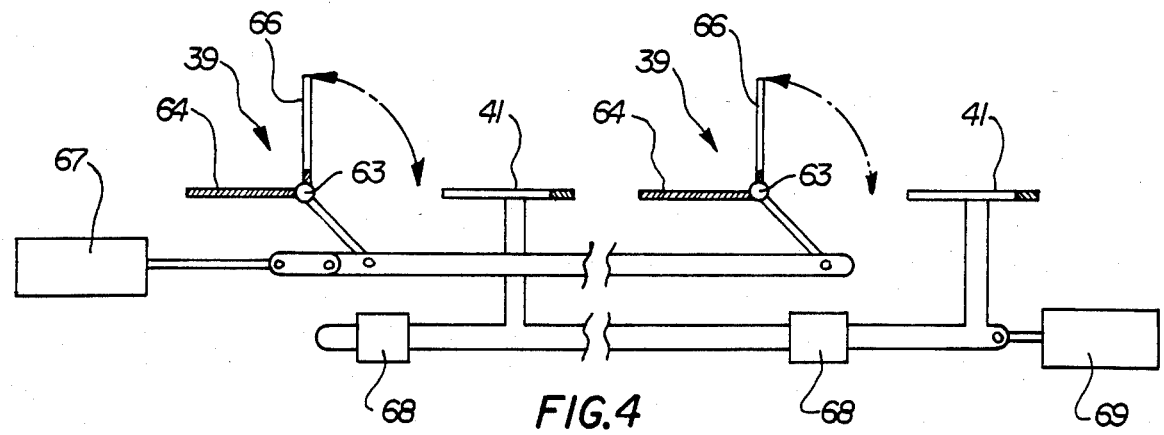
FIG. 4 is a fragmentary section taken along 4—4 of FIG. 1 schematically illustrating the turners, platforms and actuators at the second stacking station.

FIG. 4 schematically illustrates the structure at the second setting station. At this station a plurality of turners 39 are mounted on a frame (not illustrated) with pivotable movement about pivots 63. Here again, each turner is provided with two legs 64 and 66. In the slug receiving position the legs 64 extend horizontally and the legs 66 extend vertically. The turners are rotatable by an actuator 67 through 90° from the illustrated position in a clockwise direction.

Also provided at the second setting station are a plurality of laterally movable platforms 41 supported on slide bearings 68 for lateral movement toward and away from the adjacent turners 39. Here again, an actuator 69 is connected to provide the lateral movement of the platforms 41. The operation of the turners 39 and platforms 41 is described in detail below.

Figure 6:
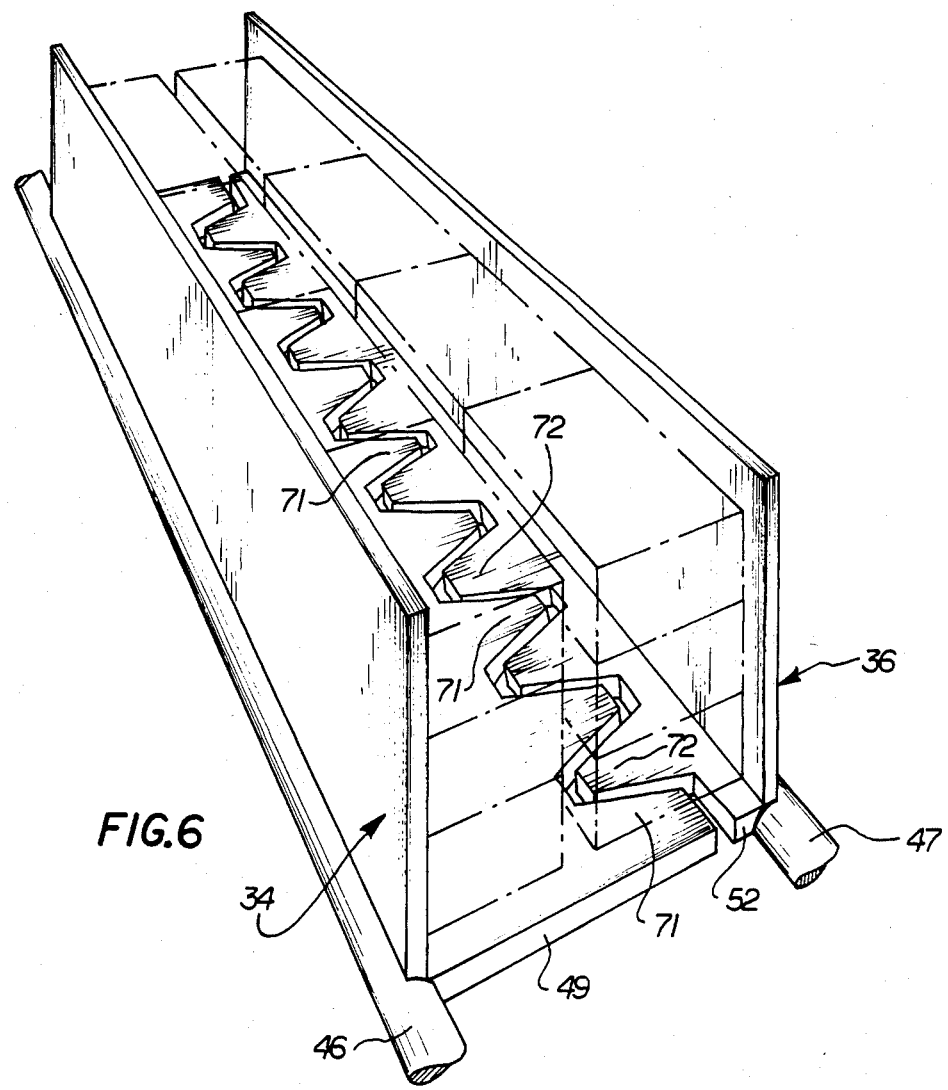
FIG. 6 is an enlarged fragmentary perspective view illustrating the fingers provided on the turners of the first setting station and illustrating how they interleave during the operation of the turners.

As best illustrated in FIG. 6 the turners 34 and 36 are formed with fingers on their legs 49 and 52 which interleave when such turners are rotated from the position of FIG. 3 to the position of FIG. 6. The legs 49 of the turners 34 are relatively long and extend in the operated position of FIG. 6 to the position substantially adjacent to the pivots 47 of the turners 36. On the other hand the legs 52 of the turners 36 are relatively short and terminate at a location substantially spaced from the pivot 46 of the turners 34. The fingers 71 of the legs 49 extend into the spaces between the fingers 72 of the legs 52 with clearance so that there is no interference Preferably the fingers 71 and 72 are tapered as illustrated in FIG. 6. With the tapered structure the two legs 49 and 52 can be easily produced from a single piece of metal plate by torch cutting the finger shape along the plate adjacent to one side to form the tapered fingers of both legs. The plate is initially somewhat narrower than the spacing between the pivots 46 and 47 so that when one piece cut from the plate is welded to the pivot structure 46 and the other piece of the plate is welded to the pivot structure 47, the fingers are spaced and provide a small amount of clearance.

With this tapered interfitting finger structure it is possible to produce the associated legs 49 and 52 without any material scrap by low cost torch cutting systems in that the material of the fingers 72 is obtained from the location of the spaces between the fingers 71 and vice versa.

As will become clear from the following description of the operation of the machine the fingers 72 extend from the leg 51 a distance which does not materially exceed the height of the brick being handled but substantially more than one half of such height. On the other hand the roots between the teeth 71 extend a distance from the leg 48 in excess of the height of a brick being handled and the outer ends of the teeth or fingers 71 are spaced from the arm 51 of an associated turner 36 a distance substantially less than one half of the height of a brick being handled.

The turners 39 and platforms 41 are also provided with fingers which interleave in the same manner as the fingers on the turners 34 and 36 when the platforms 41 are moved toward the associated turner as described in more detail below.

Figures 5A, 5B, 5C:
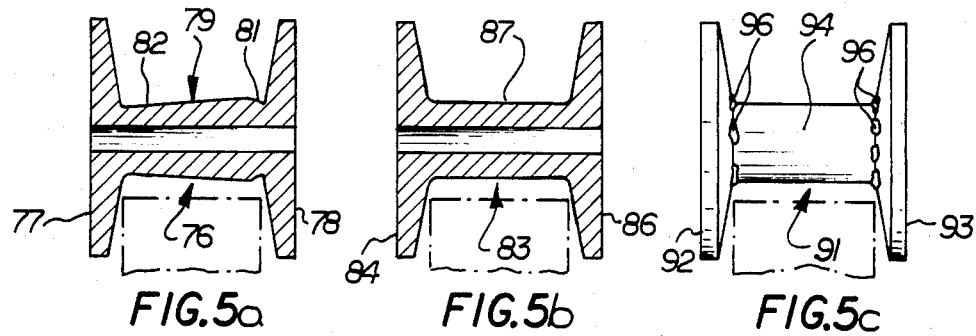
FIGS. 5a through 5c are enlarged views of the three different types of texturing roller which may be used in accordance with the present invention.

FIGS. 5a through 5c illustrate examples of some of the different types of texturing rolls which may be used in accordance with the present invention. FIG. 5a illustrates a roll 76 arranged to produce a simulated molded brick by producing a lip along one longitudinal edge of the brick adjacent to its face. Such roll is provided with a pair of flanges 77 and 78 which are spaced apart a distance exceeding the width of the brick at their outer extremities and a distance slightly less than the width of the brick adjacent to their inner extremities. The flanges have a width proportioned to allow them to fit in between the rows of brick leaving the first or preliminary spreader table 22.

Adjacent to the flange 78 the inner or hub portion 79 is formed with a radially inwardly extending slope 81 which joins with a tapered inwardly extending cone portion 82. When the brick is engaged by the hub portion with sufficient pressure, some of the material of the brick is caused to flow into the corner at the intersection of the taper 81 and the flange 78 to simulate a lip which exists in the case of molded brick. The reverse taper 82 tends to relieve the pressure engagement of the hub with the remaining portions of the face of the brick to reduce any tendency to crack or break the brick.

FIG. 5b illustrates another form of roller 83 which is again formed with tapered flanges 84 and 86 which extend inwardly and join the hub 87 at rounded corners 88 and 89. This roller provides rounded edges on the brick adjacent to the face.

FIG. 5c illustrates still another type of roller which may be employed. This roller 91 again provides tapered flanges 92 and 93. At the intersection between the flanges and the hub 94 irregular shaped projections 96 are provided to produce irregular indentation along the edges of the brick adjacent to its face.

These three rollers illustrated in FIGS. 5a through 5c are merely illustrative of the type of texturing rolls which may be employed in the machine according to this invention. Because the brick are spaced laterally from each other when they pass under the rolls, the rolls can be formed to shape the edges along the length of the face in substantially any desired manner. Further, if face texturing is required, suitable rollers having hubs shaped to provide the desired face patterns can be employed.

It should be noted that although the texturing rolls in the illustrated embodiment are located in the fixed position and the bricks are pushed under the rolls for the texturing operation, it is also within the broader scope of this invention to provide rollers which move along the brick while the brick remains stationary. For example, the rollers may be mounted on the carriage supporting the puller 26 so that as the puller returns along the length of the spreader table 22, the rows of brick resting thereon are suitably textured.

Such an arrangement, in which the brick are stationary during texturing, may be desirable in machines in which the size of the brick or the number of slugs being handled during each cycle or the brick material is such that the rows of brick tend to buckle laterally when being pulled along the bars of the spreader table 22 by the puller 26.

FIGS. 7a through 7d progressively illustrate the operation of the turners at the first setting station 38 when face setting is required. It should be understood that the number of turner pairs provided would normally exceed 3 as illustrated. There are sufficient turners to accommodate the full length of the slug which may for example include 21 or more bricks after it is cut. In the illustrated machine each of the turners operates to handle a group of three laterally spaced rows or columns of endwise abutting brick and the primary or first spreader table is arranged to spread the brick within the slug into spaced groups of three spaced columns or rows of brick which are aligned with the associated turners.

When the puller 26 operates to pull the slugs 12k through onto the turners, the operative turners each receive three rows of laterally spaced brick containing four endwise abutting brick in each row. Therefore, in the illustrated embodiment each turner is loaded with twelve brick. For face setting the turner 36 at the extreme left of the machine is not operative and is not supplied with the spaced rows of brick. Such turner functions however in other setting patterns. Each turner 34 and the turner 36 to the right thereof constitute a turner pair. The turners 34 are positioned so that their legs 38 are horizontal at the time the brick are pulled onto such turners. Similarly the turners 36 are positioned so that their legs 51 are also in the horizontal position during the brick receiving portion of the cycle.

In FIGS. 7 through 9 the face of the brick is illustrated by a double line so as to provide an indication of the location of the face during the various manipulative steps of setting the brick.

Figure 7A:
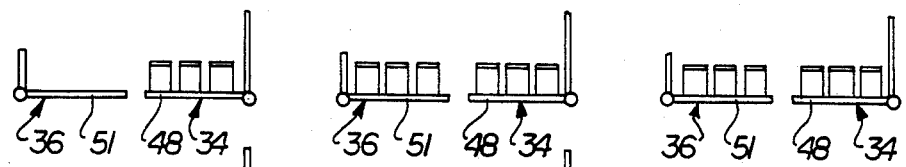
FIGS. 7a through 7d illustrate the manipulative turning steps which are performed when face setting is performed.
Figure 7B:
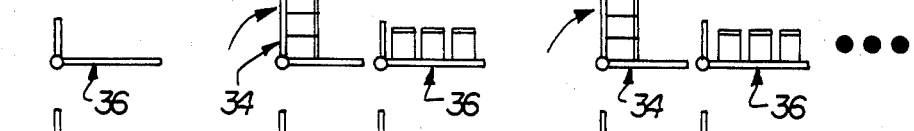

After the slugs of spaced brick are positioned on the various turners 36 and 34 as illustrated in FIG. 7a, each of the turners 34 is rotated through 90° while the turners 36 remain in their initial position. This rotation of the turners 34 is accomplished by the operation of the actuator 56 through the connecting linkage 54 and 57. This causes the three spaced rows of brick resting on the leg 48 to be rotated through 90° so that they lie on their sides in abutting relationship. After rotation of turners 34 the extremities of the arms 49 are substantially adjacent to the pivot 46 of the next adjacent turner 36. At the completion of the first operation for face setting the elements are in the position as indicated in FIG. 7b.

Figure 7C:
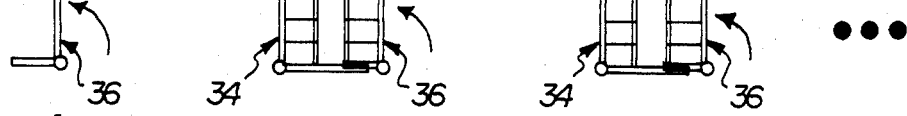
Figure 7D:
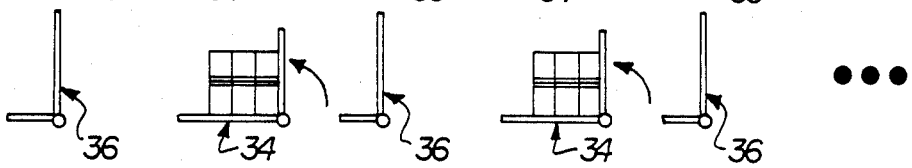

In the second operation all of the turners 36 are rotated in an anti-clockwise direction through 90° by the associated actuator 61 and the various elements assume the position illustrated in FIG. 7c. In this position the rows of brick resting on the turners 36 are also caused to move into abutting vertical alignment with the faces toward the faces of the adjacent brick on the turner 34. The fingers illustrated in FIG. 6 are proportioned to extend under the brick on the associated turner 36 to a distance exceeding one half of the height of the brick.

In the final operation for face setting the turners 34 are rotated back in an anti-clockwise direction while the turners 36 remain in their turned position. Because the fingers of the turner 34 extend under the brick originally resting on the turners 36, these brick are carried with the turner 34 through an additional angle of 90° in an anti-clockwise direction, causing the brick to be face set. In such condition the brick are arranged in pairs of vertically aligned brick in which the faces of the lower brick are at the upper side and the faces of the upper brick because of the inversion are resting on the faces of the lower brick. In effect the turners 34 rotate the brick through 90° in a clockwise direction so that they rest on their side and are abutting. The turners 36, on the other hand, turn the brick resting thereon through 90° in an anti-clockwise direction and during the return movement of the turners 34, the brick originally resting on the turners 36 are rotated through an additional 90° in an anti-clockwise direction to complete the inversion of the brick.

During the face setting operation, the entire face setting operation is performed at the first setting station; therefore during face setting, the puller 37 then drops down behind the inverted face set brick and operates to pull all the slugs from the first setting station to the second setting station. After such operation, the puller 37 is raised and returns to its pickup position and the frame 37 of the first setting station moves to the left so that an additional group of four slugs can be pulled by the puller 26 through texturing station 27 and on to the turners of the first setting station 32. While this is occurring, the puller 42 drops down behind the face set brick resting on the second setting station elements and transfers such face set brick directly to the main spreader table 42 at forward position of the slugs 12u through 12x. During the next cycle of operation, an additional four cut slugs are face set and are progressively pulled from the first setting station to the second setting station and therefrom to the spreader table 42 to the position of the slugs 12y through 12zz. The spreader table 42 then operates to reposition the brick rows for gripping by a setting head and for transfer to a kiln car or the like.

The various pullers 26, 37 and 42 are mounted on longitudinally movable carriages and powered by any suitable means not illustrated. They are also provided with actuators for raising the pullers so that they can be stroked back over the various brick or turners as the case may be to the position in which they can be lowered to perform the subsequent pulling operation. In the case of the pullers 37 and 42 the vertical legs of the pullers are formed with slots which clear the legs of the turners to permit them to operate to pull the brick along the turners without interfering therewith.

Figure 8A:
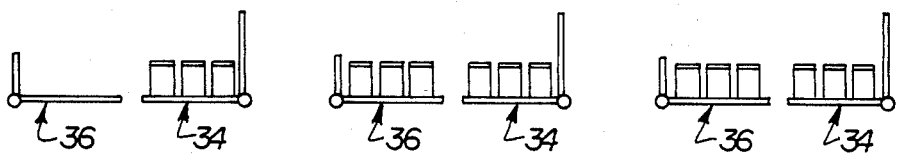
FIGS. 8a through 8c illustrate the manipulative steps performed when flat setting is performed.
Figure 8B:
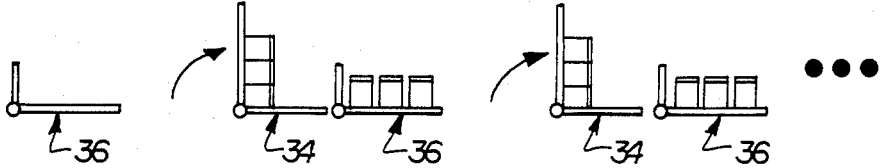
Figure 8C:
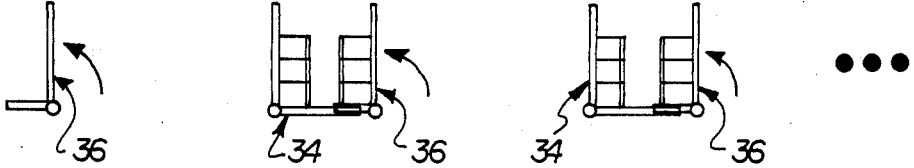

FIGS. 8a through 8c illustrate the operation of the machine for flat setting. In such an operation, the slugs are again pulled onto the turners 34 and 36 in the same way as during the face setting operation and the brick are positioned on the turners as illustrated in FIG. 8a. This operation duplicates the positioning of the turners and the brick in FIG. 7a.

In the first manipulative operation for face setting the turners 34 are rotated through 90° in a clockwise direction causing the three rows of brick resting thereon to be turned through 90° and closed up so that the three rows of brick are in vertical abutting relationship. This is the condition illustrated in FIG. 8b.

After the turners 34 are rotated through 90°, the turners 36 are rotated through 90° in an anti-clockwise direction to produce a stack of three rows of brick resting on their sides in abutting relationship as illustrated in FIG. 8c.

When the machine is operated for flat setting, the puller 37 is then operated to pull the flat set rows of brick from the first setting station 32 to the second setting station 38 and while the next group of four cut slugs are pulled onto the turners of the first setting station 32, the puller 42 tranfers the flat set brick directly to the spreader table in the same manner described previously. It should be noted that adjacent rows of brick in the flat setting configuration have their faces adjacent to each other but spaced therefrom.

FIGS. 9a through 9h illustrate the various manipulating operations for stacking without facing. Here again, the turners are placed in the same position to receive the rows of brick and three laterally spaced rows of four endwise abutting brick are positioned on each of the turners. It should be noted however that the left hand turner 36 is loaded during this operation whereas in the face setting and flat setting operations, such turner is not actually used. In such situation the turner (not illustrated) 36 at the far right side of the machine would be left empty and would not be filled as is done for face setting and flat setting.

Here again, when the turners are properly loaded a condition exists as illustrated in FIG. 9a.

The first operation here again involves the rotation of each of the turners 34 through 90° in a clockwise direction to close the spacing between the rows of brick resting thereon and to form a stack of three rows in vertical abutting alignment. At the completion of the first operation the elements are in the position of FIG. 9b. Thereafter, the turners 36 are rotated in an anti-clockwise direction through 90° to move the brick resting thereon into abutting relation and rotate such brick through 90°. This is the condition illustrated in FIG. 9c.

Thereafter, the turners 36 are rotated back to their initial position through 90° of clockwise rotation and in such position, the brick rows resting thereon are again face up but are now abutting laterally as illustrated in FIG. 9d.

At the completion of this operation, the puller 37 is operated to transfer the brick from the first setting station 32 to the second setting station. During such transfer, the rows of brick originally on the turners 34 remain on their sides and the bricks originally on the turners 36 remain face up.

Aligned with the turners 34 of the first setting station are the platforms 41 of the second setting station 38. Similarly, the second setting station provides the turners 39 in alignment with the turners 36 so as to receive the three abutting rows of face up brick from the turners 36 after the pulling operation is complete. It should be noted, however, that the pivots 63 of the turners 39 are located to the right of the pivots 47 of the turners 36. At the completion of the transfer or pulling operation from the first setting station to the second setting station, the elements of the bricks are in the position of FIG. 9e.

The first operation occurring at the second setting station 38 involves the rotation of the turners 39 through 90° in a clockwise direction so that the various elements assume the position of FIG. 9f in which the faces of all of the rows of brick are to the right and the brick are all resting on their sides in rows of three.

During the following operation, the platforms 41 are moved to the left as viewed in FIG. 9g so that the fingers thereon interleave and the brick resting on the platforms 41 are carried to a position over the fingers of the turners 39 and the elements are in the position illustrated in FIG. 9g. Thereafter as the final operation the turners 39 are again rotated but this time in an anticlockwise direction through 90°. Because the fingers of such turners are under the brick formerly positioned on the platforms 41, all of the brick are rotated in an anticlockwise direction and stacks of rows are produced in which each row includes pairs of face up brick, one resting on another. The completion of the last operation is illustrated in FIG. 9h. The puller then operates to move the stacked rows of brick onto the spreader table as previously described for transfer to a kiln car.

FIG. 10 is a view similar to FIG. 2 illustrating a brick setter machine in accordance with the second embodiment of this invention. In this embodiment, a machine is provided which arranges brick for a setting head that is approximately four times as large a setting head as illustrated in the first embodiment without materially increasing the size of the forward end of the machine and without requiring larger slugs. In this embodiment similar reference numerals indicate similar components to the first embodiment but a prime is added to indicate that reference is being made to the second embodiment.

Here again, slugs are delivered to the machine by a primary off-bearing belt 10'. The pusher 13' transfers the slugs to a secondary off-bearing belt 11' where four slugs are marshalled for transfer to the cutting station 16'. A pusher 19' operates to push the four slugs through cutting wires onto a preliminary spreader table 22' which laterally spaces the brick in the slugs to form an array of laterally spaced columns of endwise abutting brick. Each column, in the illustrated embodiment, includes four endwise abutting brick. In a particular illustrated embodiment the spreader table 22' operates to laterally move the columns apart to form groups of three columns which are substantially spaced from each other in which groups the three columns are spaced a small distance apart.

From the spreader table, the columns are moved through a texturing station 27' to the first setting or stacking station 32'. The embodiment of FIG. 10 is identical to the embodiment of FIG. 2 through the texturing station 27'. The first stacking station 32' and the second stacking station 38' differ in some respects from the corresponding stacking stations in the first embodiment as discussed in greater detail below. However, such two stacking stations cooperate again to provide stacking without facing, face setting and flat setting as desired. The mode of operation of the structure and the structural detail are discussed in detail below.

From the second stacking station 38' the columns of brick are moved onto the spreader bars on the main spreader table 43'. The spreader table 43' is substantially larger in the second embodiment than in the first embodiment and contains twice as many spreader bars each of which is twice as long as in the first embodiment. As illustrated in FIG. 2, the spreader table of the first embodiment provides groups of three spreader bars aligned with each of the turners contained in the second stacking station 38. In the second embodiment however twice as many groups of spreader bars are provided. In such second embodiment alternate groups 101' of three spreader bars 44' are in alignment with the turners 102' of the second stacking station 38' when such turners are in the position illustrated in FIG. 10. Intermediate groups 103' of spreader bars 44' are located intermediate the turners 102' when such turners are in such illustrated position. There are eight turners 102', eight groups of spreader bars 101' and eight groups of spreader bars 103'. Consequently, there are twice as many groups of spreader bars as there are turners 102'.

Each turner 102' supports six columns, each containing four endwise abutting brick. Consequently, each turner supports 24 brick arranged in columns and since there are eight turners each supporting 24 brick the turners of the second stacking station 38' handle 102 bricks during each complete cycle of operation.

During the first half of each complete cycle of operation, the turners 102' are positioned in alignment with the groups of spreader bars 101' and the columns are transferred from the turners to the spreader bar groups 101'. During the subsequent half of the complete cycle of operation, the turners are moved laterally to a position in alignment with the spreader bar groups 103' and an additional 192 brick are positioned on the groups of spreader bars 103'. During the next complete cycle of operation additional bricks are loaded on the groups of spreader bars first on the spreader bars 101' and subsequently on the spreader bars 103'.

In the illustrated embodiment such complete cycles of operation are repeated four times until the spreader table 143' is fully loaded with 1536 brick. With this system in which half of the spreader bars are loaded first and subsequently the remaining spreader bars are loaded the machine is capable of supplying a large setting head without an undue number of turners and without a very long preliminary spreader table 22'. For example, in the first embodiment of FIG. 2, the spreader table 43 provides only eight groups of three spreader bars, each of which supports two columns, one resting on the other for face setting and stacking without facing. Consequently each slug must be 48 brick long to provide an array of brick necessary to load the spreader table 43 having 24 spreader bars. However, in the second embodiment of FIG. 10, a forward end of the machine which handles slugs 48 brick long is operable to load a spreader table 43' having 48 spreader bars so the forward end of the machine is not increased in size even though the ultimate width of the spreader table 43' is twice as wide. Further, since it is twice as long, it can supply a setting head 45' which transports four times as many brick during each cycle of operation.

FIGS. 11a through 11f illustrate the arrangement of steps for face setting in accordance with the second embodiment. In the first stacking station 32' two adjacent turners 106' and 107' are each loaded with three columns 108', each containing four endwise abutting brick. Such brick rest on their back edge with their face in an upward position. The two turners 106' and 107' then rotate through 90° in opposite directions to the position illustrated in FIG. 11b in which the three columns in each of the turners are resting on their sides in abutting relationship and the faces of the brick are facing toward each other.

The turners 106' and 107' are formed with interleaving fingers so that interference will not occur when the turners rotate to the position of FIG 11b. During the face setting operation, the rotation from the position of 11a to 11b occurs sequentially with the turners 106' rotating first and the turners 107' subsequently rotating to such position.

In this embodiment, the six columns resting on their side in two groups are then pulled to the next station 38' where they are received on turners 102' as illustrated in FIG. 11c. The turner 102' then rotates in a clockwise direction through 90° to the position illustrated in FIG. 11d. In such position, all of the brick are face set and the columns are in lateral abutting relationship. Further, the position of the six face set columns is accurately established because the brick are compacted against the two legs of the turner. The columns of brick are then pulled from the turner 102' directly onto three spreader bars 44' of the main spreader table 43'. The spreader table then operates to respread the brick as illustrated in FIG. 11f. Because the brick are accurately located by the turner 102' and moved directly from the turner to the adjacent spreader bars, the brick are accurately positioned on the spreader bars.

FIGS. 12a through 12f illustrate the manipulative steps performed for stacking without facing. As illustrated in FIG. 12a three columns of brick are loaded onto each of the turners 106' and 107'. In this instance however the turner 106' is 90° of clockwise rotation from the initial position as illustrated in FIG. 11a and the first manipulative step involves rotating both of the turners 106' and 107' in an anti-clockwise direction to the position of FIG. 12b. In such position, the turner 106' is then moved to the right as indicated by the arrow 111' to position the two stacks each containing three columns of laterally and endwise abutting brick relatively close to each other. The puller then operates to move the side resting brick to the turner 102' as illustrated in FIG. 12c. In this setting arrangement the faces of the brick are both on the left side as viewed in FIG. 12c rather than adjacent to each other as in FIG. 11c.

The turner 102' then operates to rotate in a clockwise direction through 90° to a position illustrated in 12d in which the columns are stacked without facing. The columns are then moved directly from the turner 102' onto the spreader bars 44' which then operate to respread the brick to a position illustrated in FIG. 12f. Here again the operation of the turner 102' causes the stacked columns to be precisely positioned so that they can be moved directly onto the spreader bars and are accurately positioned on such spreader bars.

The operation for flat setting is illustrated in FIGS. 13a through 13g. Here again the columns 108' are positioned on the turners 106' and 107' in the same manner as in the face setting mode of operation. The two turners 106' and 107' thereafter rotate through 90° in opposite directions to a position illustrated in FIG. 13b which is the identical position illustrated in FIG. 11b. The puller then moves the side stacked columns to the turner 102' as illustrated in FIG. 13c.

The turners 102' then rotate in a clockwise direction through 90° to bring the columns into abutting relationship as illustrated in FIG. 13d. Subsequently the turner 102' rotates in the opposite direction through 90° to the position of FIG. 13e.

The purpose of the rotation in a clockwise direction through 90° followed by anti-clockwise rotation through 90° is to bring all of the columns into abutting relationship and to ensure that the exact position of the columns is achieved so that the columns can be pulled onto the spreader bars 44' and respread as illustrated in FIG. 13g for transfer to the kiln car.

Since the columns are stacked three high for flat setting each group of three spreader bars is loaded with only two stacks. Therefore one spreader bar of each group of three remains empty.

In each of the sequences illustrated in the FIGS. 11 through 13 only a single pair of turners located in the first stacking station 32' are illustrated and only a single turner located in the second stacking station 38' is illustrated. Each stacking station however contains additional turners and similar actions occur across the entire stacking stations.

With the second embodiment machine in which the bricks are accurately located in each stacking arrangement by the turners 102' of the second stacking station and are transferred directly from such turners to the spreader table 43', it is possible to operate the machine so that a given kiln car is stacked with face set arrays stacked without facing arrays and flat setting arrays.

In instances in which setting patterns of face setting and flat setting are all that is required, it is preferable to use the first embodiment and eliminate the second stacking station. In such an arrangement where stacking without facing is not required, the manipulative steps can all be performed in the first stacking station and the machine can be constructed with the main spreader table immediately adjacent to the first stacking station. On the other hand where all three forms of setting are required, the second embodiment is preferred because it tends to reduce the complication of the machine and also improves the accuracy of the positioning of the brick on the spreader table.

There are a number of separate distinct advantages to a machine in accordance with this invention. In conventional setting machines utilizing typical stackers or inverters, only one or two slugs can be gripped and stacked during a given cycle of operation of the inverter or stacker. Consequently, it is necessary for the inverter or stacker to operate at a high cycle speed if high machine outputs are desired. However, with this invention the larger number of slugs are either faced or stacked during each cycle of operation. In the illustrated machine, four slugs are simultaneously manipulated for either face setting, stacking or flat setting. Therefore, given machine output can be obtained while the facing, setting or flat setting is occurring with a cycling speed equal to one-half of the cycling speed required in the conventional prior machine. Since the inverter or stacker is usually the production limiting component of the machine, that is the component of the machine that limits the output because it cannot operate at a faster cycling speed, higher outputs can be obtained with a machine in accordance with this invention without operating the inverting and stacking components at high cycling speeds. In fact, if higher machine outputs are required, the machine can be arranged to handle more than four slugs during each cycle of operation. For example, by merely making the turners longer, they could handle for example six or eight slugs simultaneously and therefore, further increase the cycle time of the setting operations.

Another distinct advantage is obtained, with a machine in accordance with this invention. Since the brick are not gripped at any time during the setting operation, conventional gripping type inverter stackers of the type illustrated in the second embodiment of U.S. Pat. No. 3,589,495 supra which grip brick tend to damage the brick particularly if the machine is arranged to simultaneously grip two laterally abutting slugs during each cycle of operation. Further in some instances, the gripping even though it does not appear to damage the brick can produce fractures or small cracks in the brick material which allow the entry of moisture which can freeze and ultimately cause brick deterioration. Here where there is no gripping, such fractures or cracks do not tend to occur and a better product is obtained. Still further, less scrap is encountered because gripping of the brick is not required.

Additional production advantages are obtained from the fact that in many instances, longer slugs can be used. For example if the kiln car is to be set with twelve rows of stacked brick, the slugs are preferably twenty four brick long. During the stacking operation the twenty brick slug is reduced to twelve rows of pairs of brick. Since the slugs are longer the pusher which operates to push the slugs through the cutter wires can be operated at a slower cycling speed while still maintaining a given output. Further, in the illustrated embodiment in which the slugs are accumulated before cutting the cycle time for the pusher 21 can be very low while still maintaining high machine output rates.

In some instances where wide kiln cars are to be stacked, the number of rows of brick pairs to be positioned on the kiln car will equal the number of brick in each slug. In such case the main spreader table is loaded during the first cycle leaving intermediate empty spreader bars. The entire spreader table frame is then shifted laterally to position the empty spreader bars into alignment with the subsequent stacked brick rows at the second setting station. Thereafter the intermediate empty bars are then loaded to completely fill the spreader table.

Still further, with a given machine, it is possible to perform various types of setting operations. The machine can face set, flat set or stack without facing. This machine flexibility is an important feature of the invention.

The method and apparatus for texturing after initial spreading are also highly desirable. First they allow texturing down along the sides of the brick for some distance back from the face thereof so that when the brick are laid up with recessed mortar, the textured portion of the brick along its length includes the entire exposed brick surface.

In the past it has been common to attempt to texture the longitudinal edges by applying a roll to the cut joint while the brick are still in abutting relationship. The texturing that is possible in such instance is very limited, but also can produce subsequent manufacturing problems. For example, in many instances, the roller applied along the cut joint between two abutting brick or closely abutting brick causes the clay to flow a sufficient amount to in effect weld the two bricks back together. This produces problems in subsequent spreading operations and often causes the bricks to tip over when the spreader table operates. On the other hand, with the present invention, the brick are spread immediately after cutting when they are not tied together in any way. Consequently, the spreading operations do not encounter difficulty. Since the texturing is performed on the separated brick, there is no tendency for the brick to be welded together in a detrimental way during the texturing operation.

Because the stacking is performed by simple turning operations, relatively short stroke actuators can be provided and it is not necessary to rotate the turners rapidly to achieve high output.

Although the preferred embodiments of this invention have been shown and described, it should be understood that various modifications and rearrangements of the parts may be resorted to without departing from the scope of the invention as disclosed and claimed herein.

What is claimed is:

1. An apparatus selectively operable to face set, stack, and flat set brick comprising first and second groups of turners each including a plurality of turner means, and conveyor means operable to supply elongated columns of endwise abutting brick to said turner means, transfer said columns between said groups of turners, and to remove said columns therefrom:

A. said turner means being selectively operable for face setting to,
      (1) receive a plurality of said endwise abutting columns in a face upward position,
      (2) rotate adjacent columns in opposite directions through 90° about axes of rotation parallel to the length of said columns to position said brick and their sides and the faces thereof adjacent to each other, and
      (3) thereafter rotate said adjacent columns together through 90° about axes of rotation parallel to the length of said columns to position said adjacent columns one on another with said faces in contact
   B. said turner means being selectively operable for flat setting to,
      (1) receive a plurality of said endwise abutting columns in a face upward position, and
      (2) rotate said columns through substantially 90° about axes of rotation parallel to the length of said columns to positon them on their sides
   C. said turner means being selectively operable for stacking to;
      (1) receive a plurality of said endwise abutting columns in a face upward position,
      (2) rotate adjacent columns through 90° about axes of rotation parallel to the length of said columns in the same direction to position them on their sides with their faces in the same direction, and
      (3) thereafter rotate said adjacent columns together in the opposite direction about axes of rotation parallel to the length of said columns through 90° to position one on another with their faces upward.

2. An apparatus as set forth in claim 1, wherein said turner means includes a plurality of laterally spaced turners, said apparatus includes a spreader operable to receive cut slugs having a plurality of brick in lateral abutting relationship therein, said spreader being operable to laterally separate at least some of said brick in said slugs to form said columns of endwise abutting brick and to position said brick in alignment with said turners, said conveyor means operating to transfer said spaced brick from said spreader to said turner.

3. An apparatus as set forth in claim 2, wherein said spreader operates to laterally space all of said columns and texturing means are provided which longitudinally texture said laterally spaced columns before they are moved to said turner means.

4. An apparatus as set forth in claim 3, wherein said texturing means includes rollers providing flanges which extend into the spaces between said columns and operate to shape the longitudinal edges thereof, said turners receiving a plurality of said spaced columns and operating to move said columns into lateral abutting relationship.

5. An apparatus as set forth in claim 2, wherein each turner is operable to simultaneously turn a plurality of columns of brick, said columns being laterally spaced when delivered to said turners, said turners operating to move said columns into lateral abutting relationship, said turner means operating to rotate said columns without gripping the brick in said columns.

6. An apparatus for face setting elongated columns fo brick material comprising a plurality of opposed pairs of turners each rotatable through 90° and in opposite directions, said turners providing fingers which interleave when said turners turn in opposite direction toward each other, conveyor means operable to position said columns on each of said turners with the columns of one turner of said pairs of turners spaced from the columns on the other turner of said pairs of turners, said one turner operating to rotate said columns thereon through 90° towards said other turner, said other turner thereafter operating to rotate said columns thereon through 90° towards said one turner and to position them on said fingers of said one turner, said fingers of said other turner being sufficiently short to clear said columns on said one turner, said one turner thereafter rotating the columns thereon including the columns originally on said other turner through 90° to produce pairs of columns resting one on another.

7. A brick setting machine comprising a first bank of turners, a second bank of turners, each bank of turners including a plurality of laterally spaced L-shaped turners operable to support columns of endwise abutting brick and to rotate supported columns through 90° about axes parallel to the length of said columns, a spreader table providing laterally movable spreader bars adjacent to said second bank operable to receive columns of endwise abutting brick therefrom and to position said columns for gripping by a gripper head, conveyor means operable to sequentially position said columns on said first bank of turners and then on said second bank of turners, said conveyor means thereafter moving said columns of brick directly from said second bank of turners to said spreader bars, said first and second banks of turners selectively operating to face set and stack without facing said columns as well as to flat set said columns, said second bank of turners turning each column through at least one 90° turn to precisely position said columns for transfer to said spreader bars.

8. An apparatus for rearranging a plurality of laterally spaced longitudinally abutting articles comprising pivoted support means, conveyor means longitudinally feeding said laterally spaced columns to said pivoted support means, said pivoted support means vertically pivoting said columns about an axis substantially parallel thereto causing gravity to move said columns into lateral abutment, and thereafter returning said articles to their original longitudinal path, said conveyor means thereafter longitudinally feeding said articles from said pivoted support means.

9. An apparatus for stacking bricks comprising pivoted support means, conveyor means longitudinally feeding two groups of laterally spaced columns of abutting brick to pivoted support means, said pivoted support means pivoting two groups of columns about axes parallel to the length of said columns to cause the columns in each group of columns to move into laterally abutting relationship, and thereafter pivoting said groups of columns together through 90° to positon said groups of columns in abutting relationship with one group resting upon the other group.

* * * * *